(12) United States Patent
Oguro et al.

(10) Patent No.: US 7,078,477 B2
(45) Date of Patent: Jul. 18, 2006

(54) PROCESS FOR PRODUCING SOLVENT-SOLUBLE POLYIMIDE

(75) Inventors: Hiroki Oguro, Kanagawa (JP); Shuta Kihara, Kanagawa (JP); Tsuyoshi Bito, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/875,230

(22) Filed: Jun. 25, 2004

(65) Prior Publication Data

US 2004/0266979 A1    Dec. 30, 2004

(30) Foreign Application Priority Data

Jun. 26, 2003    (JP)    ............... 2003/182148

(51) Int. Cl.
  *C08G 73/10*  (2006.01)
  *C08G 69/26*  (2006.01)

(52) U.S. Cl. .............. 528/336; 528/125; 528/126; 528/128; 528/172; 528/173; 528/176; 528/179; 528/183; 528/185; 528/220; 528/229; 528/350; 528/353

(58) Field of Classification Search .......... 528/336, 528/335, 125–126, 128, 172–173, 176, 179, 528/183, 185, 220, 229, 350, 353
See application file for complete search history.

(56) References Cited

U.S. PATENT DOCUMENTS

| | | | | |
|---|---|---|---|---|
| 4,366,304 A | * | 12/1982 | Nimry et al. ............. | 528/189 |
| 4,413,115 A | * | 11/1983 | Nimry et al. ............. | 528/189 |
| 4,508,605 A | * | 4/1985 | Nimry et al. .......... | 204/157.69 |
| 4,536,560 A | * | 8/1985 | Winzenburg et al. ....... | 528/188 |
| 5,053,480 A | * | 10/1991 | Koto et al. ............. | 528/188 |
| 5,059,677 A | * | 10/1991 | Kohtoh et al. ............ | 528/353 |
| 6,500,913 B1 | * | 12/2002 | Mathew et al. ........... | 528/170 |

FOREIGN PATENT DOCUMENTS

| | | | |
|---|---|---|---|
| JP | 2002-080596 | * | 3/2002 |
| JP | 2003-119284 | * | 4/2003 |

* cited by examiner

*Primary Examiner*—P. Hampton Hightower
(74) *Attorney, Agent, or Firm*—Antonelli, Terry, Stout and Kraus, LLP.

(57) ABSTRACT

In the process of the present invention, a solvent-soluble polyimide is produced by polycondensing at least one tetracarboxylic acid component with at least one diamine component in a solvent in the presence of a tertiary amine. The tetracarboxylic acid component is selected from the group consisting of tetracarboxylic dianhydrides represented by the following formula 1:

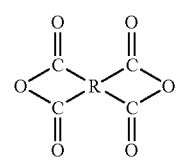

(1)

wherein R is as defined in the specification, and tetracarboxylic acids and their derivatives represented by the following formula 2:

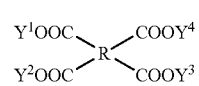

(2)

wherein R and $Y^1$ to $Y^4$ are as defined in the specification. Unlike the conventional techniques using an excessively large amount of a chemical imidation agent such as acetic anhydride and a chemical imidation catalyst such as triethylamine, in the process of the present invention, the solvent-soluble polyimide having a high polymerization degree is easily produced in a solvent with good productivity by using only a catalytic amount of the tertiary amine.

15 Claims, No Drawings

PROCESS FOR PRODUCING SOLVENT-SOLUBLE POLYIMIDE

BACKGROUND OF THE INVENTION

1. Field of the Invention

The present invention relates to an efficient process for producing a polyimide soluble in specific solvents which is excellent in storage stability, handling property and processability.

2. Description of the Prior Art

As conventionally known in the arts, solvent-soluble polyimides have been produced by a high-temperature solution polymerization method or a chemical imidation method. In the high-temperature solution polymerization method, a polyamic acid having a sufficiently high molecular weight is first produced, and then heated in the presence of a necessary and sufficient amount of a water-azeotropic agent such as aromatic hydrocarbons while removing generated water out of the reaction system, using an apparatus capable of removing only water out of the reaction system but recycling the water-azeotropic agent into the reaction system (Japanese Patent Application Laid-Open No. 2003-119284). In the chemical imidation method, a polyamic acid having a sufficiently high molecular weight is first produced, and then imidated at an ordinary temperature or under heating using an excessively large amount of a chemical imidation agent such as acetic anhydride (Japanese Patent Application Laid-Open No. 2002-80596).

However, the high-temperature solution polymerization method has various problems such as prolonged time required for producing polyamic acid having a sufficiently high molecular weight, deficient increase in molecular weight and imidation rate due to failure to rapidly remove water out of the reaction system, necessity of using the water-azeotropic agent and special apparatus, deterioration in solubility of the polyimide due to adverse influence of the water-azeotropic agent, and high costs in productive facilities and production. The chemical imidation method has problems such as prolonged time required for producing polyamic acid having a sufficiently high molecular weight, necessity of purification process for removing an excessively large amount of the chemical imidation agent such as acetic anhydride, and high costs in productive facilities and production.

SUMMARY OF THE INVENTION

An object of the present invention is to solve the above problems in conventional techniques and provide a process for producing a solvent-soluble polyimide which is advantageous in view of productive facilities and productivity.

As a result of extensive researches and studies in view of the above object, the inventors have found that a solvent-soluble polyimide is produced advantageously in view of production facilities and productivity, by polycondensing at least one compound selected from the group consisting of non-aromatic tetracarboxylic dianhydrides, non-aromatic tetracarboxylic acids and their derivatives with a diamine in the presence of a tertiary amine. The present invention has been accomplished on the basis of this finding.

Thus, the present invention provides a process for producing a solvent-soluble polyimide, comprising a step of polycondensing at least one tetracarboxylic acid component with at least one diamine component in a solvent in the presence of a tertiary amine, said at least one tetracarboxylic acid component being selected from the group consisting of tetracarboxylic dianhydrides represented by the following formula 1:

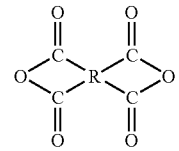

(1)

wherein R is a tetravalent group derived from a $C_2$ to $C_{12}$ compound that is selected from the group consisting of straight-chain hydrocarbons, branched hydrocarbons, alicyclic hydrocarbons, bialicyclic hydrocarbons, and spiro compounds optionally having oxygen constituting a spiro ring, and tetracarboxylic acids and their derivatives represented by the following formula 2:

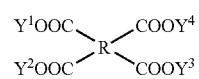

(2)

wherein R is the same as defined in the formula 1 and $Y^1$ to $Y^4$ are the same or different and each independently hydrogen or a $C_1$ to $C_8$ hydrocarbon group.

DETAILED DESCRIPTION OF THE INVENTION

In general, polyimides are usually produced using a tetracarboxylic dianhydride as the tetracarboxylic acid component. In the process of the present invention, in addition to the tetracarboxylic dianhydrides, their corresponding tetracarboxylic acids and esters of the tetracarboxylic acids and alcohols are usable to produce practically usable polyimides. In the present invention, the tetracarboxylic acid can be used as-obtained to make the process advantageous in view of production facilities and costs.

The tetracarboxylic dianhydrides usable in the present invention are represented by the following formula 1:

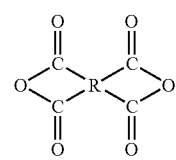

(1)

In the formula 1, R is a tetravalent group derived from a $C_2$ to $C_{12}$, preferably $C_4$ to $C_{12}$, more preferably $C_4$ to $C_6$ compound that is selected from the group consisting of straight-chain hydrocarbons, branched hydrocarbons, alicyclic hydrocarbons, bialicyclic hydrocarbons, and spiro compounds optionally having at least one oxygen constituting a spiro ring. Examples of the tetravalent straight-chain or branched hydrocarbon groups includes tetravalent groups derived from compounds such as ethane, propane, butane, pentane and hexane; examples of the tetravalent alicyclic hydrocarbon groups include tetravalent groups derived from compounds such as cyclobutane, cyclopentane and cyclohexane; examples of the tetravalent bialicyclic hydrocarbon groups include tetravalent groups derived from compounds such as bicyclo[2.2.1]heptane and bicyclo[2.2.2]octane; and examples of the tetravalent spiro groups which may contain one or more oxygen in its spiro ring include tetravalent groups derived from compounds such as spiro[3.4]octane, spiro[4.5]decane, spiro[5.5]undecane and spiro compounds having one or more carbon atoms in the spiro ring replaced with oxygen.

Examples of the tetracarboxylic dianhydride represented by the formula 1 include 1,2,3,4-cyclobutanetetracarboxylic dianhydride, 1,2,4,5-cyclopentanetetracarboxylic dianhydride, 1,2,4,5-cyclohexanetetracarboxylic dianhydride, bicyclo[2.2.2]oct-7-ene-2,3,5,6-tetracarboxylic dianhydride, ethane-1,1,2,2-tetracarboxylic dianhydride, 1,2,3,4-butanetetracarboxylic dianhydride, 2,8-dioxaspiro[4.5]decane-1,3,7,9-tetraone and methanetetraacetic dianhydride.

The tetracarboxylic acids and their derivatives usable in the present invention are represented by the following formula 2:

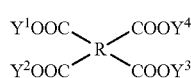

(2)

In the formula 2, R is the same as defined in the formula 1, and $Y^1$ to $Y^4$ are the same or different and each independently hydrogen or a $C_1$ to $C_8$ hydrocarbon group, preferably hydrogen or $C_1$ to $C_4$ alkyl group.

Examples of the tetracarboxylic acids and their derivatives represented by the formula 2 include 1,2,3,4-cyclobutanetetracarboxylic acid, 1,2,4,5-cyclopentanetetracarboxylic acid, 1,2,4,5-cyclohexanetetracarboxylic acid, bicyclo[2.2.2]oct-7-ene-2,3,5,6-tetracarboxylic acid, ethane-1,1,2,2-tetracarboxylic acid, 1,2,3,4-butanetetracarboxylic acid, 2,8-dioxaspiro[4.5]decane-1,3,7,9-tetracarboxylic acid, methanetetraacetic acid and $C_1$ to $C_8$ alcohol esters thereof.

The compounds of the formulas 1 and 2 may be used as the tetracarboxylic acid component singly or in combination of two or more. If combinedly used, the mixing ratio is not critical and not specifically limited. Of the above compounds, particularly preferred as the tetracarboxylic acid component are 1,2,4,5-cyclohexanetetracarboxylic dianhydride and 1,2,4,5-cyclohexanetetracarboxylic acid.

In addition to the compounds of the formulas 1 and 2, the tetracarboxylic acid component may further contain another tetracarboxylic acid or its derivative (additional tetracarboxylic acid or its derivative) unless the solvent-solubility of the resultant polyimides is adversely affected. Examples of the additional tetracarboxylic acids and derivatives include pyromellitic acid, 3,3',4,4'-biphenyltetracarboxylic acid, 2,3,3',4'-biphenyltetracarboxylic acid, 2,2-bis(3,4-dicarboxyphenyl)propane, 2,2-bis(2,3-dicarboxyphenyl)propane, 2,2-bis(3,4-dicarboxyphenyl)-1,1,1,3,3, 3-hexafluoropropane, 2,2-bis(2,3-dicarboxyphenyl)-1,1,1,3,3,3-hexafluoropropane, bis(3,4-dicarboxyphenyl) sulfone, bis(3,4-dicarboxyphenyl) ether, bis(2,3-dicarboxyphenyl) ether, 3,3',4,4'-benzophenonetetracarboxylic acid, 2,2',3,3'-benzophenonetetracarboxylic acid, 4,4-(p-phenylenedioxy)diphthalic acid, 4,4-(m-phenylenedioxy)diphthalic acid, ethylenetetracarboxylic acid, 3-carboxymethyl-1,2,4-cyclopentanetricarboxylic acid, 1,1-bis(2,3-dicarboxyphenyl)ethane, bis(2,3-dicarboxyphenyl)methane, bis(3,4-dicarboxyphenyl)methane and derivatives thereof. The content of the additional tetracarboxylic acids and derivatives in the tetracarboxylic acid component is preferably less than 50 mol% (inclusive of zero).

The diamine component usable in the present invention is selected from $C_6$ to $C_{28}$, aromatic diamines and $C_2$ to $C_{28}$, non-aromatic diamines. Examples of the aromatic diamines include p-phenylenediamine, m-phenylenediamine, 4,4'-diaminobiphenyl, 4,4'-diamino-2,2'-dimethylbiphenyl, 4,4'-diamino-3,3'-dimethylbiphenyl, 4,4'-diamino-2,2'-ditrifluoromethylbiphenyl, 4,4'-diaminodiphenyl ether, 3,4'-diaminodiphenyl ether, 4,4'-diaminodiphenylmethane, 4,4'-diaminobenzophenone, 4,4'-diaminodiphenyl sulfone, 4,4'-diaminodiphenyl sulfide, 1,4-bis(4-aminophenoxy)benzene, 1,3-bis(4-aminophenoxy)benzene, 4,4'-bis(4-aminophenoxy)biphenyl, bis[4-(4-aminophenoxy)phenyl] sulfone, bis[4-(3-aminophenoxy)phenyl] sulfone and 9,9-bis(4-aminophenyl)fluorene. Examples of the non-aromatic diamines include ethylenediamine, hexamethylenediamine, polyethylene glycol bis(3-aminopropyl) ether, polypropylene glycol bis(3-aminopropyl) ether, 1,3-bis(aminomethyl)cyclohexane, 1,4-bis(aminomethyl)cyclohexane, 4,4'-diaminodicyclohexylmethane, 3(4),8(9)-bis(aminomethyl)-tricyclo[5.2.1.0$^{2,6}$]decane, m-xylylenediamine, p-xylylenediamine, isophoronediamine, norbornanediamine and siloxanediamine. These diamines may be used singly or in combination of two or more. Of these diamines, particularly preferred are aromatic diamines such as 4,4'-diamino-3,3'-dimethylbiphenyl, 4,4'-diamino-2,2'-ditrifluoromethylbiphenyl, 4,4'-diaminodiphenyl ether, 4,4'-diaminodiphenylmethane, 1,4-bis(4-aminophenoxy)benzene, 1,3-bis(4-aminophenoxy)benzene and 4,4'-bis(4-aminophenoxy)biphenyl; and non-aromatic diamines such as 4,4'-diaminodicyclohexylmethane and 3(4),8(9)-bis(aminomethyl)-tricyclo[5.2.1.0$^{2,6}$]decane.

Examples of the tertiary amines include trimethylamine, triethylamine, tripropylamine, tributylamine, triethanolamine, N,N-dimethylethanolamine, N,N-diethylethanolamine, triethylenediamine, N-methylpyrolidine, N-ethylpyrolidine, N-methylpiperidine, N-ethylpiperidine, imidazole, pyridine, quinoline and isoquinoline. Of these tertiary amines, especially preferred are triethylamine and N-ethylpiperidine.

Examples of the solvents usable in the present invention include γ-butyrolactone, N,N-dimethylacetamide, N-methyl-2-pyrrolidone, N,N-dimethylformamide, dimethylsulfoxide, hexamethylphosphoramide, tetramethylene sulfone, p-chlorophenol, m-cresol and 2-chloro-4-hydroxytoluene. These solvents may be used singly or in combination of two or more. Of these solvents, preferred are γ-butyrolactone, N,N-dimethylacetamide and N-methyl-2-pyrrolidone, with γ-butyrolactone and N,N-dimethylacetamide being more preferred. Further, a poor solvent for the polyimide may be used in combination with these solvents in such an amount not allowing polyimide to precipitate. Examples of the poor solvent include hexane, heptane, benzene, toluene, xylene, chlorobenzene and o-dichlorobenzene. The amount of the poor solvent to be used is preferably 50% by weight or less (inclusive of zero) based on the total solvent.

The process of the present invention will be described below.

The tetracarboxylic acid component and the diamine component are charged into a reaction vessel by a method of charging both the components at the same time or a method of gradually charging one of the components in the form of solid or solution into a solution of the other component (not necessarily be a complete solution), although not limited to these methods. The method of charging both the components at the same time is advantageous in view of the productivity because the time required for charging is shortened.

In the process of the present invention, the polycondensation is allowed to proceed by heating nearly equimolar amounts of the tetracarboxylic acid component and the diamine component in the solvent in the presence of the tertiary amine. The charging molar ratio of either the tetracarboxylic acid component and the diamine component to the other is preferably 95 to 105 mol %, more preferably 99 to 101 mol %. If less than 95 mol % or more than 105 mol %, the resultant polyimide has an impractically low molecular weight.

The solvent may be charged into a reaction vessel by a method of charging the solvent fist of all, a method of charging the solvent into a reaction vessel in which either or both the tetracarboxylic acid component and the diamine component are already charged, a method of charging as a solution dissolving either the tetracarboxylic acid component and the diamine component, although not limited to these methods. These methods may be used singly or in combination of two or more. If desired, an additional amount of the solvent may be added to a reaction solution during the polycondensation, a reaction product solution still held in a reaction vessel after the polycondensation, or a reaction product solution taken out of a reaction vessel. The solvent is used in an amount such that the total concentration of the tetracarboxylic acid component and the diamine component in the reaction solution is preferably 1 to 50% by weight, more preferably 20 to 45% by weight.

In the present invention, the solvent-soluble polyimide having a high polymerization degree is produced in the solvent using only a catalytic amount of the tertiary amine without using an excessively large amount of a chemical imidation agent such as acetic anhydride and an excessively large amount of a chemical imidation catalyst such as triethylamine.

The amount of the tertiary amine to be used is preferably 0.001 to 1.0 mol, more preferably 0.01 to 0.2 mol per one mole of the tetracarboxylic acid component. If less than 0.001 mol, the resultant polyimide is not practical because of its low polymerization degree. If exceeding 1.0 mol, the amount of the tertiary amine, which serves as a poor solvent for polyimides, increases to allow polyimides to precipitate as solid matters, reducing the handling ability.

To obtain a sufficient catalytic effect, it is preferred to charge the tertiary amine into a reaction vessel before the reaction temperature reaches an intended level. In particular, the tertiary amine is more preferably charged simultaneously with the solvent, the tetracarboxylic acid component and the diamine component.

In the process of the present invention, the reaction mixture is heated to an intended reaction temperature while removing a distillate composed mainly of water out of the reaction system by using a vapor condenser that is connected to the upper portion of reaction vessel directly or via a fractionating column together with a condensate storage connected to the vapor condenser. The reaction temperature is preferably 150 to 250° C., and after reaching an intended temperature within this range, the reaction system is held at this temperature preferably for 0.2 to 48 h, more preferably 0.5 to 10 h. The polycondensation may be performed usually under atmospheric pressure. If the reaction temperature is less than 150° C., the molecular weight of the resultant polymer is not sufficiently increased, thereby failing to obtain a practically usable polyimide.

To control the molecular weight and modify the end groups, an acid anhydride or monoamine may be added to the reaction system.

The formation of polyimide may be confirmed by characteristic absorptions attributable to imide ring observed around 1770 and 1700 $cm^{-1}$ in IR spectrum. The polymerization degree of polyimide may be relatively determined by measuring a logarithmic viscosity. The logarithmic viscosity is measured at 30° C. on a 0.5 g/dL solution of polyimide in N-methyl-2-pyrrolidone. If the logarithmic viscosity is less than 0.4 dL/g, it is difficult to obtain a self-supporting film because of an insufficient polymerization degree of polyimide. The process of the present invention is advantageous in the productivity, because a solvent-soluble polyimide having a high polymerization degree, i.e., having a logarithmic viscosity as high as 0.6 dL/g or more, preferably 0.6 to 1.2 dL/g is stably produced.

The polyimide solution obtained according to the present invention is used as-produced in various applications such as film formation and protective film formation. In addition, the polyimide solution may be diluted with a solvent or added with an additive such as surfactant, flame retardant, antioxidant and filler according to aimed applications. The polyimide solution obtained in the present invention exhibits excellent storage stability and can be stored for a long period of time after its production, resulting in enhanced productivity. Further, a solid polyimide can be separated from the polyimide solution by a known method and used in desired applications by dissolving again in a solvent, etc.

Although depending upon the kind of diamine component used, the polyimide produced by the process of the present invention is excellent in colorless transparency, particularly when having cyclohexanetetracarboxylic acid skeleton. For example, the total light transmittance of a film of 100 μm thick reaches 87% or higher when 4,4'-diaminodiphenyl ether or 4,4'-diaminodicyclohexylmethane is used as the diamine component. The polyimide produced by the present invention also has a high heat resistance and is suitably used as the raw materials for colorless transparent boards, colorless transparent protective films, etc.

The present invention will be described in more detail below with reference to the following examples and comparative examples. However, these examples are only illustrative and not intended to limit the scope of the invention thereto.

Polyimide films obtained in the following examples and comparative examples were evaluated by the following methods.

(1) Glass Transition Temperature

Determined by DSC measurement at a temperature rise rate of 10° C./min under a nitrogen flow using a differential scanning colorimeter "DSC-50" available from Shimadzu Corporation.

(2) Initiation Temperature of Thermal Decomposition

Determined by DTG measurement at a temperature rise rate of 10° C./min under a nitrogen flow using a thermogravimetric analyzer "DTG-50" available from Shimadzu Corporation.

(3) Total Light Transmittance

Measured on films using a color difference/turbidity meter "COH-300A" available from Nippon Denshoku Kogyo Co., Ltd.

(4) Logarithmic Viscosity

The measurement was conducted on a 0.5 g/dL solution of polyimide in N-methyl-2-pyrrolidone at 30° C. using a Canon Fenske viscometer and the logarithmic viscosity was calculated from the following formula:

$$\eta_{inh} = [ln(T/T_0)]/C$$

wherein T is the dropping time of the solution, $T_0$ is the dropping time of the solvent and C is the concentration of the solution.

PRODUCTION EXAMPLE 1

Production of 1,2,4,5-cyclohexanetetracarboxylic dianhydride

A 5-L Hastelloy (HC22) autoclave was charged with 552 g of pyromellitic acid, 200 g of a catalyst of Rh supported on activated carbon (available from N.E. Chemcat Corporation) and 1656 g of water, and then the inner atmosphere was replaced with nitrogen gas while stirring the contents. Then, the inner atmosphere was replaced with hydrogen gas and the temperature was raised to 60° C. under a hydrogen pressure of 5.0 MPa. The reaction was continued for 2 h while maintaining the hydrogen pressure at 5.0 MPa. After replacing the hydrogen gas in the autoclave with nitrogen gas, the reaction product solution was taken out of the autoclave and filtered hot to separate the catalyst. The filtrate was concentrated under reduced pressure using a rotary evaporator to precipitate crystals. The precipitated crystals were subjected to solid-liquid separation and then dried to obtain 481 g of 1,2,4,5-cyclohexanetetracarboxylic acid (yield: 85.0%).

Into a 5-L separable glass flask equipped with a Dimroth condenser, were charged 450 g of 1,2,4,5-cyclohexanetetracarboxylic acid thus obtained and 4000 g of acetic anhydride, and the inner atmosphere was replaced with nitrogen gas while stirring the contents. The contents were heated to a refluxing temperature of the solvent in nitrogen gas atmosphere to reflux the solvent for 10 min, and thereafter, cooled to room temperature under stirring to precipitate crystals. The crystals were subjected to solid-liquid separation and dried to obtain primary crystals. The mother liquor was concentrated under reduced pressure using a rotary evaporator to precipitate crystals. The precipitated crystals were subjected to solid-liquid separation and dried to obtain secondary crystals. Thus, 375 g of 1,2,4,5-cyclohexanetetracarboxylic dianhydride in total of the primary and secondary crystals was obtained (anhydration yield: 96.6%).

EXAMPLE 1

Into a 300-mL five-necked flask equipped with a thermometer, a stirring device, a nitrogen inlet, a fractionating column and a Liebig condenser, were charged 7.0 g of N,N-dimethylacetamide, 27.8 g of γ-butyrolactone, 0.25 g (0.0025 mol) of triethylamine, 11.32 g (0.05 mol) of 1,2,4,5-cyclohexanetetracarboxylic dianhydride and 10.06 g (0.05 mol) of 4,4'-diaminodiphenyl ether under a nitrogen gas flow. The temperature was raised to 180° C. while stirring and then held for 3 h. During the heating to 180° C., a distillate composed mainly of water was separated and recovered. After reducing the inner temperature to 150° C. by air cooling, 30.0 g of N,N-dimethylacetamide was added, followed by stirring the mixture until obtaining a uniform solution. Thereafter, the inner temperature was reduced to 60° C. by air cooling, and then the reaction product solution was taken out of the flask. The reaction product solution was uniform and transparent, and the solubility of polyimide was good. The solution thus obtained was coated on a glass plate, dried at 100° C. for one hour on a hot plate, and peeled from the glass plate to obtain a self-supporting film. The self-supporting film was fixed to stainless steel fixing jig and then dried in a hot air dryer at 220° C. for 2 h to obtain a colorless, transparent flexible film of 100 μm thick. The characteristic absorptions of imide ring were observed in IR spectrum of the film at ν(C=O) 1772 and 1700 cm$^{-1}$ to show the formation of polyimide. The film had a glass transition temperature of 307° C. (DSC), an initiation temperature of heat decomposition of 479° C. (DTG), a total light transmittance of 89% and a logarithmic viscosity of 0.95 dL/g.

EXAMPLE 2

In the same manner as in Example 1 except for using 13.14 g (0.05 mol) of 1,2,4,5-cyclohexanetetracarboxylic acid in place of 1,2,4,5-cyclohexanetetracarboxylic dianhydride and changing the holding time to 8 h, a polyimide was produced. The reaction product solution was uniform and transparent, and the solubility of polyimide was good. Then, the reaction product solution was formed into a colorless, transparent flexible film of 100 μm thick in the same manner as in Example 1. The characteristic absorptions of imide ring were observed in IR spectrum of the film at ν(C=O) 1772 and 1700 cm$^{-1}$ to show the formation of polyimide. The film had a glass transition temperature of 319° C. (DSC), an initiation temperature of heat decomposition of 470° C. (DTG), a total light transmittance of 89% and a logarithmic viscosity of 0.66 dL/g.

EXAMPLE 3

In the same manner as in Example 1 except for using 14.69 g (0.05 mol) of 1,4-bis(4-aminophenoxy)benzene in place of 4,4'-diaminodiphenyl ether and changing the holding time to 6 h, a polyimide was produced. The reaction product solution was uniform and transparent, and the solubility of polyimide was good. Then, the reaction product solution was formed into a colorless, transparent flexible film of 100 μm thick in the same manner as in Example 1. The characteristic absorptions of imide ring were observed in IR spectrum of the film at ν(C=O) 1772 and 1704 cm$^{-1}$ to show the formation of polyimide. The film had a glass transition temperature of 290° C. (DSC), an initiation temperature of heat decomposition of 478°C. (DTG), a total light transmittance of 88% and a logarithmic viscosity of 0.91 dL/g.

EXAMPLE 4

In the same manner as in Example 1 except for using 18.51 g (0.05 mol) of 4,4'-bis(4-aminophenoxy)biphenyl in place of 4,4'-diaminodiphenyl ether and changing the holding time to 4 h, a polyimide was produced. The reaction product solution was uniform and transparent, and the solubility of polyimide was good. Then, the reaction product solution was formed into a colorless, transparent flexible film of 100 μm thick in the same manner as in Example 1. The characteristic absorptions of imide ring were observed in IR spectrum of the film at ν(C=O) 1772 and 1706 cm$^{-1}$ to show the formation of polyimide. The film had a glass transition temperature of 292° C. (DSC), an initiation temperature of heat decomposition of 472° C. (DTG), a total light transmittance of 89% and a logarithmic viscosity of 1.18 dL/g.

EXAMPLE 5

In the same manner as in Example 1 except for using 0.28 g (0.0025 mol) of N-ethylpiperidine in place of triethylamine, a polyimide was produced. The reaction product solution was uniform and transparent, and the solubility of polyimide was good. Then, the reaction product solution was formed into a colorless, transparent flexible film of 100 μm thick in the same manner as in Example 1. The characteristic absorptions of imide ring were observed in IR spectrum of the film at $\nu(C=O)$ 1772 and 1700 $cm^{-1}$ to show the formation of polyimide. The film had a total light transmittance of 89% and a logarithmic viscosity of 1.00 dL/g.

EXAMPLE 6

In the same manner as in Example 1 except for using 10.52 g (0.05 mol) of 4,4'-diaminodicyclohexylmethane in place of 4,4'-diaminodiphenyl ether and changing the holding time to 0.5 h, a polyimide was produced. The reaction product solution was uniform and transparent, and the solubility of polyimide was good. Then, the reaction product solution was formed into a colorless, transparent flexible film of 100 μm thick in the same manner as in Example 1. The characteristic absorptions of imide ring were observed in IR spectrum of the film at $\nu(C=O)$ 1768 and 1689 $cm^{-1}$ to show the formation of polyimide. The film had a glass transition temperature of 264° C. (DSC), an initiation temperature of heat decomposition of 390° C. (DTG), a total light transmittance of 89% and a logarithmic viscosity of 0.62 dL/g.

COMPARATIVE EXAMPLE 1

Into a 300-mL five-necked flask, that was equipped with a thermometer, a stirring device, a nitrogen inlet and a Dean-Stark trap, kept at 5° C. in an ice-water bath, were charged 14.09 g (0.07 mol) of 4,4'-diaminodiphenyl ether, 24.0 g of N,N-dimethylacetamide, 95.8 g of γ-butyrolactone and 18.0 g of xylene under nitrogen gas flow, and the contents were stirred until obtaining a uniform solution. Then, 15.85 g (0.07 mol) of solid 1,2,4,5-cyclohexanetetracarboxylic dianhydride was added in several portions with care for generation of heat. After removing the ice-water bath, the stirring was continued for 3 h while keeping the contents at room temperature of about 25° C. Then, xylene was refluxed under heating for 6 h while removing the generated water out of the reaction system. During the reflux operation, the inner temperature was raised up to 186° C. Thereafter, the inner temperature was lowered to 60° C. by air cooling, and the reaction product solution was taken out of the flask. The reaction product solution was uniform and transparent, and the solubility of polyimide was good. Then, the reaction product solution was formed into a colorless, transparent flexible film of 100 μm thick in the same manner as in Example 1. The characteristic absorptions of imide ring were observed in IR spectrum at $\nu(C=O)$ 1772 and 1700 $cm^{-1}$ to show the formation of polyimide. The logarithmic viscosity of the film was 0.44 dL/g.

COMPARATIVE EXAMPLE 2

Into a 300-mL five-necked flask equipped with a thermometer, a stirring device, a nitrogen inlet and a Dean-Stark trap, were added 15.0 g of N,N-dimethylacetamide, 59.9 g of γ-butyrolactone, 30.0 g of xylene, 10.62 g (0.04 mol) of 1,2,4,5-cyclohexanetetracarboxylic acid and 8.09 g (0.04 mol) of 4,4'-diaminodiphenyl ether under a nitrogen gas flow, and the contents were stirred. Then, xylene was refluxed under heating for 16 h while removing the generated water out of the reaction system. During the reflux operation, the inner temperature was raised up to 194° C. Thereafter, the inner temperature was lowered to 60° C. by air cooling, and the reaction product solution was taken out of the flask. The reaction product solution was uniform and transparent, and the solubility of polyimide was good. It was attempted to form a film from the reaction product solution in the same manner as in Example 1, but no self-supporting film was obtained because the polymerization degree of polyimide was insufficient. The characteristic absorptions of imide ring were observed in IR spectrum of the film piece at $\nu(C=O)$ 1772 and 1700 $cm^{-1}$ to show the formation of polyimide. The logarithmic viscosity of the film was 0.38 dL/g.

According to the process for producing the solvent-soluble polyimide of the present invention, the problems in the conventional techniques mentioned above are solved, and a practically usable polyimide is easily produced with high productivity. The polyimide is produced at low costs and the polyimide produced is excellent in storage stability, handling properties and processability. Therefore, the process of the present invention is of great industrial advantage.

What is claimed is:

1. A process for producing a solvent-soluble polyimide, comprising a step of polycondensing at least one tetracarboxylic acid component with at least one diamine component in a solvent in the presence of a tertiary amine as a catalyst and being in addition to the solvent, said step of polycondensing being performed with a reaction mixture consisting essentially of said at least one tetracarboxylic acid component, said at least one diamine component, said solvent and said tertiary amine, said at least one tetracarboxylic acid component being selected from the group consisting of tetracarboxylic dianhydrides represented by the following formula 1:

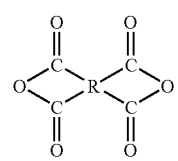

(1)

wherein R is a tetravalent group derived from a $C_2$ to $C_{12}$ compound that is selected from the group consisting of straight-chain hydrocarbons, branched hydrocarbons, alicyclic hydrocarbons, bialicyclic hydrocarbons, and spiro compounds optionally having oxygen constituting a spiro ring, and tetracarboxylic acids and their derivatives represented by the following formula 2:

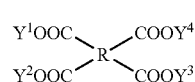

(2)

wherein R is the same as defined in the formula 1 and $Y^1$ to $Y^4$ are the same or different and each independently hydrogen or a $C_1$ to $C_8$ hydrocarbon group.

2. The process according to claim 1, wherein the tetracarboxylic dianhydride represented by the formula 1 is at least one compound selected from the group consisting of 1,2,3,4-cyclobutanetetracarboxylic dianhydride, 1,2,4,5-cyclopentanetetracarboxylic dianhydride, 1,2,4,5-cyclohexanetetracarboxylic dianhydride, bicyclo[2.2.2]oct-7-ene-2,3,5,6-tetracarboxylic dianhydride, ethane-1,1,2,2-tetracarboxylic dianhydride, 1,2,3,4-butanetetracarboxylic dianhydride, 2,8-dioxaspiro [4.5]decane-1,3,7,9-tetraone and methanetetraacetic dianhydride.

3. The process according to claim 2, wherein the tetracarboxylic dianhydride is 1,2,4,5-cyclohexanetetracarboxylic dianhydride.

4. The process according to claim 1, wherein the tetracarboxylic acid or its derivatives represented by the formula 2 is at least one compound selected from the group consisting of 1,2,3,4-cyclobutanetetracarboxylic acid, 1,2,4,5-cyclopentanetetracarboxylic acid, 1,2,4,5-cyclohexanetetracarboxylic acid, bicyclo[2.2.2]oct-7-ene-2,3,5,6-tetracarboxylic acid, ethane-1,1,2,2-tetracarboxylic acid, 1,2,3,4-butanetetracarboxylic acid, 2,8-dioxaspiro[4.5]decane -1,3,7,9-tetracarboxylic acid, methanetetraacetic acid and $C_1$ to $C_8$ alcohol esters of the preceding acids.

5. The process according to claim 4, wherein the tetracarboxylic acid is 1,2,4,5-cyclohexanetetracarboxylic acid.

6. The process according to claim 1, wherein the diamine component is at least one compound selected from the group consisting of $C_6$ to $C_{28}$ aromatic diamines and $C_2$ to $C_{28}$ non-aromatic diamines.

7. The process according to claim 6, wherein the aromatic diamine is at least one compound selected from the group consisting of 4,4'-diamino-3,3'-dimethylbiphenyl, 4,4'-diamino-2,2'-ditrifluoromethylbiphenyl, 4,4'-diaminodiphenyl ether, 4,4'-diaminodiphenylmethane, 1,4-bis(4-aminophenoxy) benzene, 1,3-bis(4-aminophenoxy)benzene and 4,4'-bis(4-aminophenoxy) biphenyl.

8. The process according to claim 6, wherein the non-aromatic diamine is at least one of 4,4'-diaminodicyclohexylmethane and 3(4),8(9)-bis (aminomethyl)-tricyclo [5.2.1.0$^{2,6}$] decane.

9. The process according to claim 1, wherein the tertiary amine is at least one compound selected from the group consisting of trimethylamine, triethylamine, tripropylamine, tributylamine, triethanolamine, N,N-dimethylethanolamine, N,N-diethylethanolamine, triethylenediamine, N-methylpyrolidine, N-ethylpyrolidine, N-methylpiperidine, N-ethylpiperidine, imidazole, pyridine, quinoline and isoquinoline.

10. The process according to claim 9, wherein the tertiary amine is at least one of triethylamine and N-ethylpiperidine.

11. The process according to claim 1, wherein the tertiary amine is used in an amount of 0.001 to 1.0 mol per one mole of the tetracarboxylic acid component.

12. The process according to claim 1, wherein the solvent is at least one compound selected from the group consisting of γ-butyrolactone, N,N-dimethylacetamide, N-methyl-2-pyrrolidone, N,N-dimethylformamide, dimethylsulfoxide, hexamethylphosphoramide, tetramethylene sulfone, p-chlorophenol, m-cresol and 2-chloro-4-hydroxytoluene.

13. The process according to claim 12, wherein the solvent is at least one of γ-butyrolactone and N,N-dimethylacetamide.

14. The process according to claim 1, wherein the polycondensing is performed in a reaction vessel, and the tertiary amine is charged simultaneously into the reaction vessel with the solvent, the at least one tetracarboxylic acid component and the at least one diamine component.

15. The process according to claim 11, wherein the tertiary amine is used in an amount of 0.01 to 0.2 mol per one mole of the tetracarboxylic acid component.

* * * * *